Dec. 24, 1929.　　　　A. E. ADAM　　　　1,740,913
HEADLIGHT TURNING MEANS FOR VEHICLES
Filed April 9, 1925
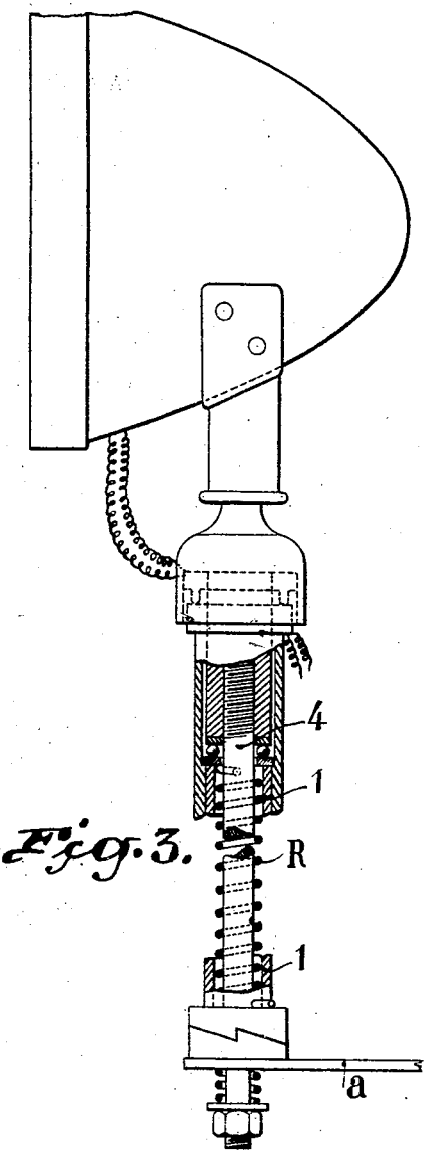
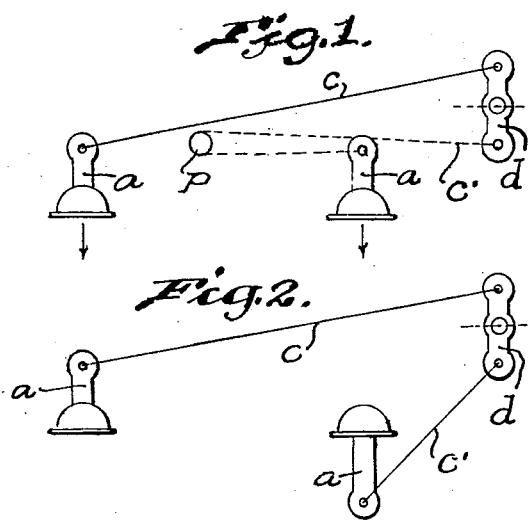
Inventor
Auguste Edmond Adam
By B. Singer. Atty.

Patented Dec. 24, 1929

1,740,913

UNITED STATES PATENT OFFICE

AUGUSTE EDMOND ADAM, OF WIMEREUX, FRANCE

HEADLIGHT-TURNING MEANS FOR VEHICLES

Application filed April 9, 1925, Serial No. 21,957, and in France July 30, 1924.

The invention relates to a device for the adjustment of the headlights on automobiles in the direction of travel in which only one headlight is adjusted at the time by using flexible pulling elements such as cords, ropes, chains and the like which are actuated by the turning knuckle of the axle.

The object of the invention is to provide simple and efficient means for automatically directing the headlights.

The invention consists in that a double armed lever is provided on one turning point of the axle, the free ends of said lever being connected with the headlights by means of flexible cords or the like, one of the said cords having a bight passing over a pulley.

According to Fig. 1 each headlight is provided with an arm $a$ while the journals are equipped with two armed levers $d$. The headlight which is farther from $d$ is directly connected to one arm of said lever by means of a cord $c$ while the other headlight which is nearer to this lever, is connected with its opposite arm by means of a cord $c'$ which passes over a pulley $p$ provided on a suitable bearing support on the chassis.

In the accompanying drawings

Fig. 1 is a diagram illustrating headlight adjusting means constructed and arranged in accordance with this invention.

Fig. 2 is a similar view of a modification of the same.

Fig. 3 is an elevation, partly in section, of a support for a light projector constructed and arranged in accordance with this invention.

By moving the double armed lever $d$ in either direction, the connected headlight is moved by reason of the tension on the pulling element $c$ or $c'$. To prevent the motion from being transferred to the cord which is not actuated any suitable means may be provided such as counter weight, roller device, spring and the like.

In the arrangement according to Fig. 2 the cord $c'$ instead of passing over a pulley passes directly to the headlight arm $a$ adjacent the lever $d$, said arm being set at 180° with respect to the other arm.

What I claim, is:

Means for adjusting the headlights on automobiles in the direction of travel, so that only one headlight is adjusted at the time, comprising a double armed lever provided on one turning knuckle of the axle, and flexible cords connecting the free ends of said lever to the headlight, one of said cords having a bight, and a pulley engaged by said bight.

In witness whereof I affix my signature.

AUGUSTE EDMOND ADAM.